(12) United States Patent
Chang et al.

(10) Patent No.: US 7,568,366 B2
(45) Date of Patent: **\*Aug. 4, 2009**

(54) DRUM-TYPE WASHING MACHINE AND BEARING HOUSING STRUCTURE THEREOF

(75) Inventors: Jae Won Chang, Kyungki-do (KR); Hee Tae Lim, Kyungki-do (KR); Si Moon Jeon, Seoul (KR); Kyeong Hwan Kim, Seoul (KR); Hyun Seok Seo, Inchun-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/470,704

(22) Filed: Sep. 7, 2006

(65) Prior Publication Data

US 2007/0017261 A1 Jan. 25, 2007

Related U.S. Application Data

(63) Continuation of application No. 11/165,332, filed on Jun. 24, 2005.

(30) Foreign Application Priority Data

Jul. 20, 2004 (KR) ................................ 2004-56258

(51) Int. Cl.
*D06F 37/22* (2006.01)
(52) U.S. Cl. .................................. 68/24; 68/58; 68/140
(58) Field of Classification Search ...................... 68/24, 68/58, 140; 134/184, 198
See application file for complete search history.

(56) References Cited

U.S. PATENT DOCUMENTS 912,038 A 2/1909 Seifert (Continued)

FOREIGN PATENT DOCUMENTS

CN 1332816 1/2002

(Continued)

OTHER PUBLICATIONS

English language Abstract of CN 1332816.

(Continued)

*Primary Examiner*—Frankie L Stinson
(74) *Attorney, Agent, or Firm*—Birch, Stewart, Kolasch & Birch, LLP

(57) ABSTRACT

A drum type washing machine including a tub installed in a cabinet is disclosed. The drum type washing machine includes a drum performing washing, a motor rotating the drum, bearing housings having bearings to support a rotation shaft, a suspension connected to the bearing housings and the cabinet to mitigate vibration generated during rotation of the drum, a bracket installed to the bearing housings to form the rear side of the tub, and a gasket installed between the bracket and the tub to seal the tub and to prevent vibration from being transmitted from the bracket to the tub. Volumes of the tub and the drum can be easily increased without increasing the volume of the cabinet. Even when the volume of the washing machine is changed, only one of the tub and the bearing housings, which is not applicable to the drum type washing machine having the changed washing capacity, is selectively replaced. Thus parts can commonly used in various drum type washing machine having different volume.

21 Claims, 6 Drawing Sheets

U.S. PATENT DOCUMENTS

| | | | |
|---|---|---|---|
| 1,470,245 A | 10/1923 | Slider | |
| 1,611,895 A | 12/1926 | Dienner | |
| 1,787,427 A | 1/1931 | Eckhard | |
| 2,191,607 A | 2/1940 | Chamberlin et al. | |
| 2,296,257 A | 9/1942 | Breckenridge | |
| 2,323,765 A | 7/1943 | Haberstump | |
| 2,356,818 A * | 8/1944 | Bruckman | 68/23.2 |
| 2,408,509 A | 10/1946 | Clark | |
| 2,434,476 A | 1/1948 | Wales | |
| 2,509,516 A | 5/1950 | Murphy | |
| 2,526,002 A * | 10/1950 | Brotman | 68/140 |
| 2,526,048 A | 10/1950 | Russell | |
| 2,527,239 A | 10/1950 | Woodson | |
| 2,542,509 A | 2/1951 | Goriup | |
| 2,565,604 A | 8/1951 | Geiger | |
| 2,579,472 A | 12/1951 | Chamberlin et al. | |
| 2,717,135 A * | 9/1955 | Douglas | 68/212 |
| 2,758,685 A | 8/1956 | Sisson | |
| 2,882,706 A | 4/1959 | Brucken | |
| 2,908,871 A | 10/1959 | McKay | |
| 2,984,094 A | 5/1961 | Belaieff | |
| 2,990,706 A * | 7/1961 | Bochan | 68/12.15 |
| 3,066,522 A | 12/1962 | Steinmuller | |
| 3,089,326 A * | 5/1963 | Belaieff | 68/23.2 |
| 3,153,951 A * | 10/1964 | Whelan | 74/665 K |
| 3,178,916 A * | 4/1965 | Belaieff et al. | 68/23.2 |
| 3,197,983 A * | 8/1965 | Ilmer | 68/23.1 |
| 3,206,267 A | 9/1965 | Gruner et al. | |
| 3,356,222 A * | 12/1967 | Belaieff | 210/363 |
| 3,389,881 A * | 6/1968 | Stelwagen | 68/212 |
| 3,391,469 A * | 7/1968 | Reeder | 34/58 |
| 3,459,461 A | 8/1969 | Bannon, Jr. | |
| 3,477,259 A | 11/1969 | Barrett et al. | |
| 3,927,542 A | 12/1975 | de Hedouville | |
| 4,114,406 A * | 9/1978 | Horowitz et al. | 68/24 |
| 4,295,387 A * | 10/1981 | Zhivotov et al. | 74/573.11 |
| 4,412,390 A | 11/1983 | Grant | |
| 4,446,706 A | 5/1984 | Hartwig | |
| 4,498,181 A | 2/1985 | Menown et al. | |
| 4,989,684 A * | 2/1991 | Conaway | 180/89.15 |
| 5,080,204 A * | 1/1992 | Bauer et al. | 188/129 |
| 5,199,690 A * | 4/1993 | Marshall | 267/64.25 |
| 5,230,229 A | 7/1993 | Stadelmann et al. | |
| 5,526,657 A | 6/1996 | Johnson | |
| 5,657,649 A * | 8/1997 | Lim | 68/23.3 |
| 5,711,170 A | 1/1998 | Johnson | |
| 5,711,171 A * | 1/1998 | Uhlin | 68/4 |
| 5,979,195 A | 11/1999 | Bestell et al. | |
| 6,122,843 A | 9/2000 | Noguchi et al. | |
| 6,343,492 B1 | 2/2002 | Seagar et al. | |
| 6,363,756 B1 | 4/2002 | Seagar et al. | |
| 6,474,114 B1 | 11/2002 | Ito et al. | |
| 6,477,867 B1 | 11/2002 | Collecutt et al. | |
| 6,481,035 B2 | 11/2002 | Seagar et al. | |
| 6,578,391 B2 | 6/2003 | Seagar et al. | |
| 2004/0025544 A1 | 2/2004 | Kim et al. | |
| 2004/0031295 A1 | 2/2004 | Choi | |
| 2004/0123631 A1 | 7/2004 | Chang | |
| 2004/0129035 A1 | 7/2004 | Chang | |
| 2004/0237603 A1 | 12/2004 | Kim et al. | |
| 2004/0244121 A1 | 12/2004 | Lim et al. | |
| 2005/0028564 A1 | 2/2005 | Lee et al. | |
| 2005/0188472 A1 | 9/2005 | Park et al. | |
| 2006/0010612 A1 | 1/2006 | Kim et al. | |
| 2006/0011429 A1 | 1/2006 | Park et al. | |

FOREIGN PATENT DOCUMENTS

| | | |
|---|---|---|
| CN | 1511997 | 7/2004 |
| DE | 1912481 | 3/1965 |
| DE | 2633604 | 2/1978 |
| DE | 2746989 | 4/1978 |
| DE | 3134633 | 6/1982 |
| DE | 3811583 | 10/1989 |
| DE | 4239504 | 5/1994 |
| DE | 4310594 | 10/1994 |
| DE | 4330079 | 3/1995 |
| EP | 0132805 | 2/1985 |
| EP | 0124939 | 1/1988 |
| EP | 0405068 | 1/1991 |
| EP | 0272949 | 4/1991 |
| EP | 0716177 | 6/1996 |
| EP | 0750064 | 12/1996 |
| EP | 0725179 | 7/2000 |
| EP | 1055765 | 11/2000 |
| EP | 1079014 | 2/2001 |
| EP | 1094239 | 4/2001 |
| EP | 1433890 | 6/2004 |
| EP | 1505191 | 2/2005 |
| EP | 1386996 | 11/2007 |
| GB | 1120431 | 7/1968 |
| GB | 2096649 | 10/1982 |
| GB | 2157326 | 10/1985 |
| GB | 2202867 | 10/1988 |
| JP | 4-236988 | 8/1992 |
| JP | 4-240488 | 8/1992 |
| JP | 6-079087 | 3/1994 |
| JP | 2002-346281 | 12/2002 |
| KR | 1999-0066050 | 8/1999 |
| KR | 2001-0009545 | 2/2001 |
| KR | 10-2004-0011307 | 2/2004 |
| KR | 10-2004-0047223 | 6/2004 |
| KR | 10-2004 0058999 | 7/2004 |
| SU | 1663074 | 7/1991 |
| WO | 98/29595 | 7/1998 |

OTHER PUBLICATIONS

English language Abstract of KR 10-2004-0047223.
English language Abstract of JP 4-236988.
English language Abstract of KR 2001-0009545.
English language Abstract of JP 4-240488.
English language Abstract of JP 6-079087.
English language Abstract of KR 10-2004-0011307.
English language Abstract of DE 3134633.
English language Abstract of JP 2002-346281.
English language Abstract of EP 1433891.

* cited by examiner

DRUM-TYPE WASHING MACHINE AND BEARING HOUSING STRUCTURE THEREOF

CROSS-REFERENCE TO RELATED APPLICATIONS

This application is a continuation of pending U.S. patent application Ser. No. 11/165,332, filed Jun. 24, 2005, the disclosure of which is expressly incorporated herein by reference in its entirety.

FIELD OF THE INVENTION

The present invention relates to a drum type washing machine, and more particularly, to a drum type washing machine in which a tub is directly connected to a cabinet, and a drum in the tub and a motor for rotating the drum are supported in the cabinet by a suspension, and a bearing housing structure thereof.

DESCRIPTION OF THE RELATED ART

A conventional drum type washing machine, as shown in FIG. 1, includes a rectangular box-shaped cabinet 1, in which a door 2 is installed to the front side thereof, a tub 3 disposed in the cabinet in the horizontal direction to accommodate washing water, a spring 5 and a damper 6 for supporting the tub 3 in the cabinet 1 and for buffering shock, a drum 8 rotatably installed in the tub 3 for washing laundry, and a motor 10 installed at the rear side of the tub 3 to rotate the drum 8.

In FIG. 1, reference numeral 21 is assigned to a gasket for preventing the washing water from leaking between the cabinet and the tub, and reference numerals 23 and 25 are assigned to a water supply and a drain device, respectively.

FIG. 2 is a partially sectional perspective view of the portion "A" in FIG. 1, and illustrates a structure in which the motor 10 is installed at the rear sides of the drum and the tub 3.

Between the motor 10 and the drum 8, a rotation shaft 12 for transmitting rotary power is installed to connect the motor 10 with the drum 8, and the drum 10 includes a hub 13 installed at the rear side thereof, to which the rotation shaft 12 is connected.

The tub 3 includes a bearing housing 14, installed at the rear side of the tub 3, through which the rotation shaft 12 penetrates, and a bearing 15 for supporting the rotation shaft 12 is installed in the bearing housing 14.

Here, the bearing housing 14 is made of steel or aluminum, such that stiffness sufficient to support the rotation shaft 12 can be maintained, and is fixed to the rear side of the tub 3 via insert molding. The bearing 15 is fixed in the bearing housing 14 by being compulsorily tightly fitted against the bearing housing 14.

The motor 10 is an abduction motor in which a stator 10S is positioned at the center of the motor 10 and a rotor 10r is positioned around the stator 10S, wherein the stator 10S is assembled with and fixed to the bearing housing 14 by bolts 17 and the rotor 10R is fixed to the end of the rotation shaft 12.

However, in the conventional drum type washing machine as described above, since the drum 8 and the motor 10 are supported by the tub 3, the tub 3 is supported in the cabinet 1 by the spring 5 and the damper 6, a predetermined space between the cabinet 1 and the tub 3 is required. Thus, there is also a limit to increase the size of the drum 8 performing washing process in the cabinet 1 with a predetermined volume.

Moreover, in the conventional drum type washing machine, since the drum 8, the bearing 15, and the motor 10 are vibrated together with the tub 3, reaction force is generated by the bearing in proportion to the vibration, and a metal bearing housing 14 is fixed to the tub 3 via insert molding to securely fix the bearing 15 to the tub 3.

However, since sizes of the tub 3 and the bearing housing 14 must be changed when volume of the conventional drum type washing machine is changed, the tub 3 and the bearing housing 14 cannot be used in common, and a tub 3 and a bearing housing 14 with different sizes must be manufactured.

SUMMARY OF THE INVENTION

Therefore, the present invention has been made in view of the above and/or other problems, and it is an object of the present invention to provide a drum type washing machine in which a tub is directly installed in a cabinet and vibration elements such as a drum and a motor are directly supported in the cabinet by a suspension such that there is no need for a separate clearance between the cabinet and the tub, causing an increase in the size of the drum to maximize volume of the drum type washing machine.

It is another object of the present invention to provide a drum type washing machine in which defective parts are conveniently repaired or replaced when a tub or a bearing housing malfunctions, by installing the bearing housing separately from the tub without fixing the bearing housing to the tub by the insert-molding, and only one of the tub and the bearing housing, which is not applicable to the drum type washing machine having the changed washing capacity, is selectively replaced. Thus parts can commonly used in various drum type washing machine having different volume.

In accordance with the present invention, the above and other aspects can be accomplished by the provision of drum type washing machine including a tub installed in a cabinet, a drum, disposed in the tub, in which washing is performed, a motor disposed at the rear side of the tub to rotate the drum, bearing housings disposed between the drum and the motor and respectively having bearings to support a rotation shaft, a suspension connected to the bearing housings and the cabinet to mitigate vibration generated during the rotation of the drum, a bracket installed to the front sides of the bearing housings to form the rear side of the tub, and a gasket installed between the bracket and the tub to seal the tub and to prevent vibration from being transmitted from the bracket to the tub.

Preferably, the tub is fixed to the cabinet such that the front side of the tub is attached to the inner surface of the cabinet.

The bearing housings includes a main bearing housing fixed to the bracket, and a sub-bearing housing, coupled to the rear side of the main bearing housing, to which a stator of the motor is fixed.

The main bearing housing and the sub-bearing housing are convex in opposite directions such that the central portions of the main bearing housing and the sub-bearing housing, through which the rotation shaft penetrates, are spaced apart from each other.

The main bearing housing and the sub-bearing housing are made of pressed metal plates.

The main bearing housing has a semi-circular upper side higher than a part through which the rotation shaft penetrates, and a rectangular lower side lower than the part through which the rotation shaft penetrates.

Preferably, the sub-bearing housing is circular.

The suspension is connected to the main bearing housing.

The bracket includes a seal member, installed at the intermediate portion thereof, for preventing washing water from leaking between the bracket and the rotation shaft.

The another object of the present invention is achieved by the provision of a structure of bearing housings (76 and 78) of a drum type washing machine including a rotation shaft penetrating through a tub to connect a drum and a motor for driving the drum, a main bearing housing fixed to a portion for forming the rear side of the tub to support a rotation shaft of the motor, a sub-bearing housing coupled with the rear side of the main bearing housing to support the rotation shaft.

The main bearing housing and the sub-bearing housing are convex in opposite directions such that the central portions of the main bearing housing and the sub-bearing housing, through which the rotation shaft penetrates, are spaced apart from each other.

Preferably, the main bearing housing and the sub-bearing housing are made of pressed metal plates.

The bearing housings are supported on a cabinet forming the outer appearance of the drum type washing machine by a suspension to mitigate vibration generated during rotation of the drum.

The another object of the present invention is achieved by the provision of a drum type washing machine including a tub directly fixed in a cabinet, a drum, disposed in the tub, in which washing is performed, a motor disposed at the rear side of the tub to rotate the drum, a main bearing housing fixed to a portion for forming the rear side of the tub to support a rotation shaft of the motor, a sub-bearing housing coupled with the rear side of the main bearing housing to support the rotation shaft, and a suspension connected to the main bearing housing and the cabinet to mitigate vibration generated during the rotation of the drum.

Moreover, in the drum type washing machine according to the present invention, since the bearing housing is separated from the tub instead of being fixed to the tub by the insert molding, when one of the tub and the bearing housing malfunctions, only the malfunctioning component must be replaced. According to the present invention, when either the tub or the bearing housing of a drum type washing machine malfunctions, the malfunctioning component may be replaced using a drum or bearing housing designed for a drum type machine of a different volume. Thus, the parts are interchangeable among drum type washing machines with different volumes.

BRIEF DESCRIPTION OF THE DRAWINGS

These and/or other aspects and advantages of the present invention will become apparent and more readily appreciated from the following description of the embodiments, taken in conjunction with the accompanying drawings, in which.

DESCRIPTION OF THE PREFERRED EMBODIMENTS

Hereinafter, the preferred embodiments of the drum type washing machine according to the present invention will be described in detail with reference to the accompanying drawings.

Although several embodiments of the drum type washing machines are possible according to the present invention, hereinafter, only the drum type washing machine according to the preferred embodiment of the present invention will be described.

Figure 1:
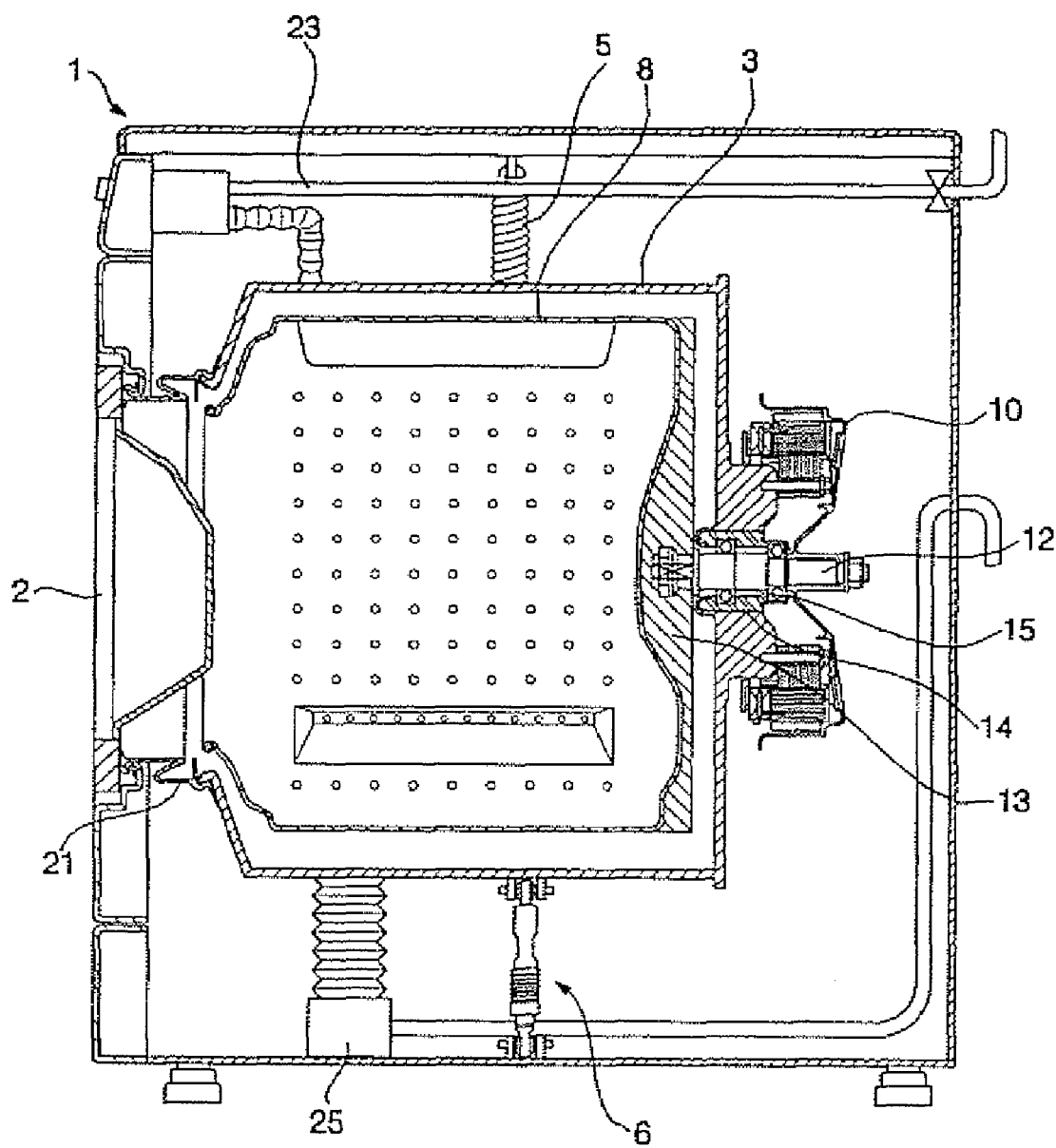
FIG. 1 is a sectional elevation view illustrating an inner structure of a conventional drum type washing machine.
Figure 2:
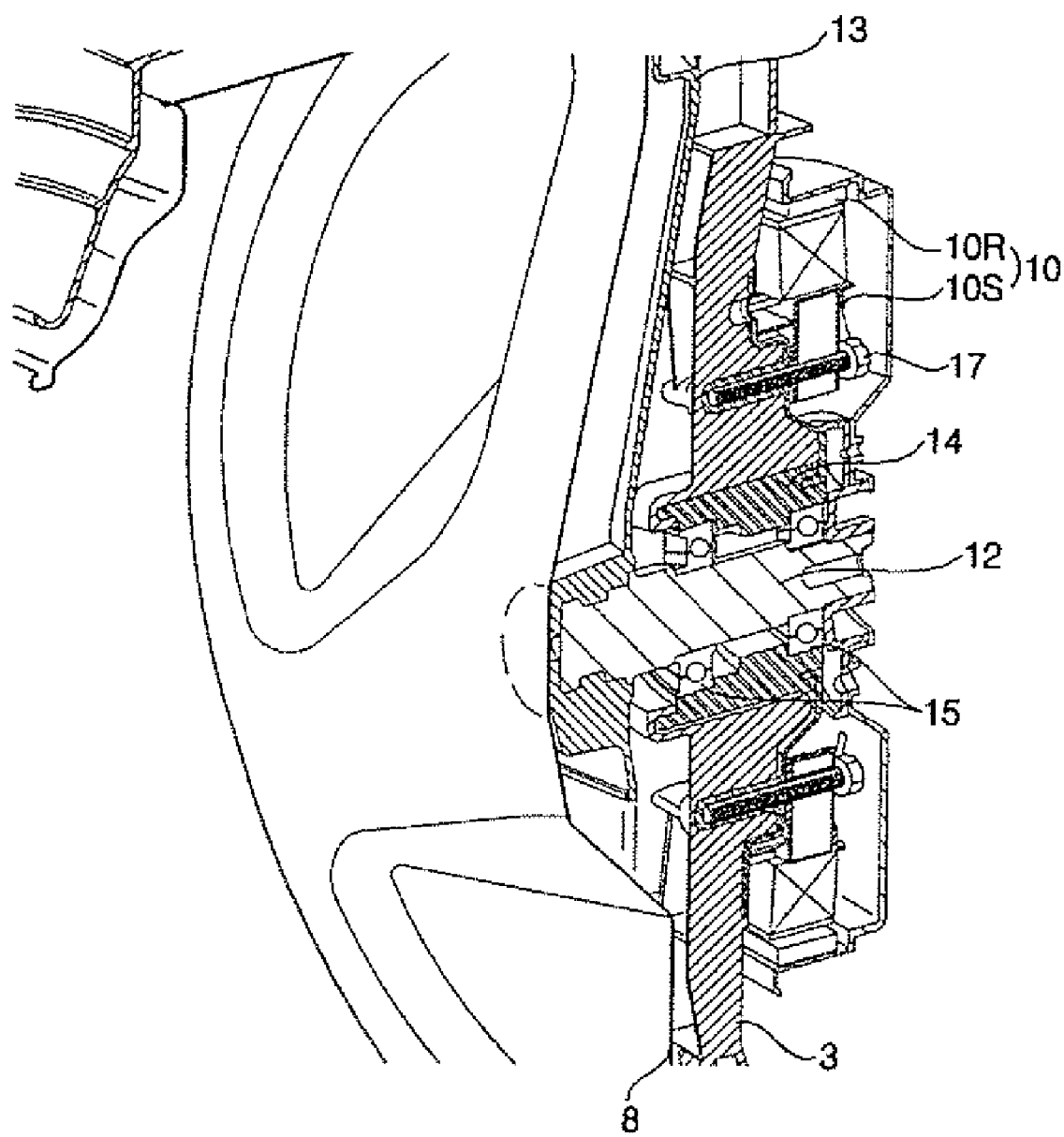
FIG. 2 is a partially sectional perspective view of a portion "A" in FIG. 1.
Figure 3:
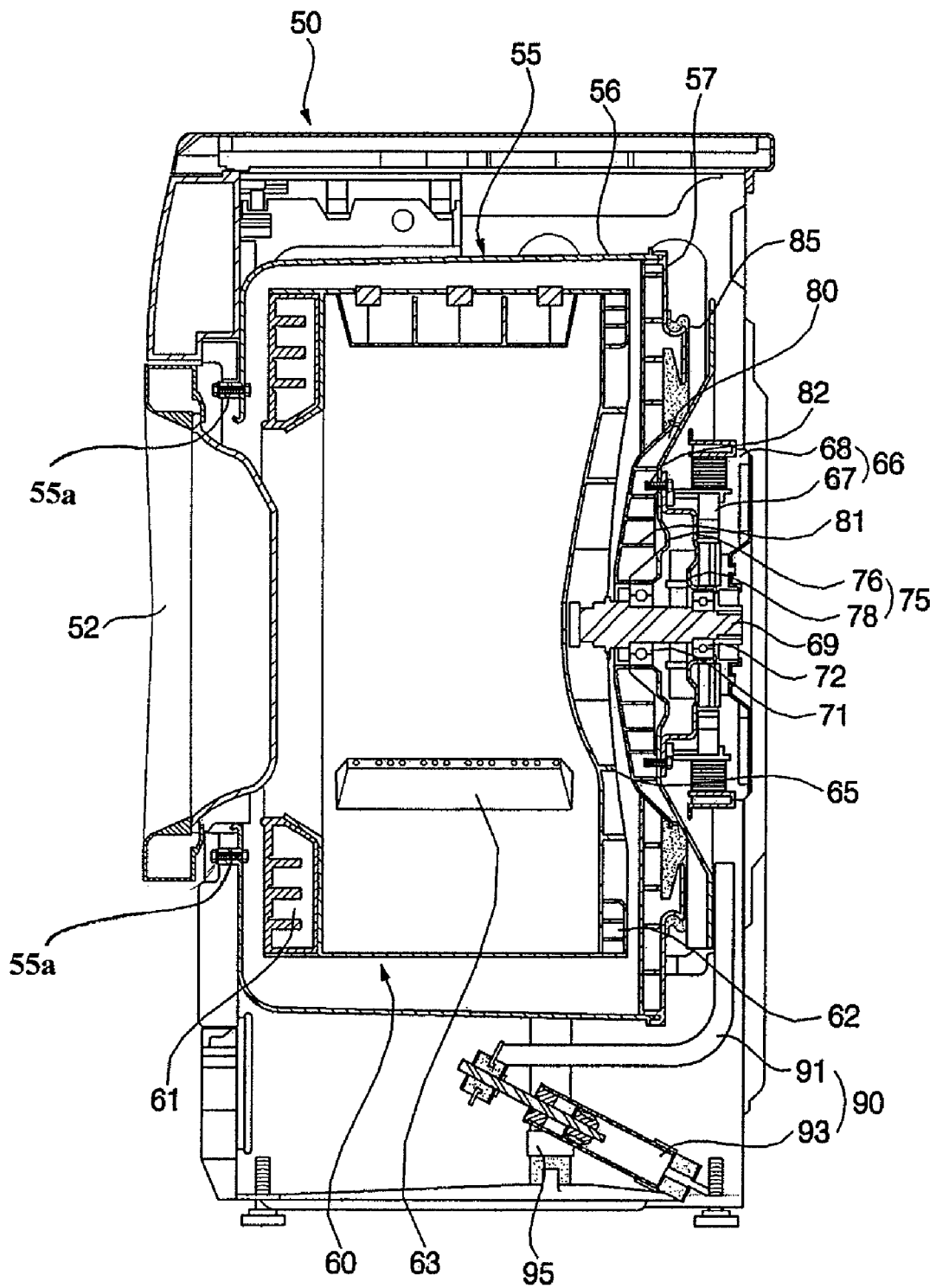
FIG. 3 is a sectional elevation view illustrating an inner structure of a drum type washing machine according to a preferred embodiment of the present invention.
Figure 4:
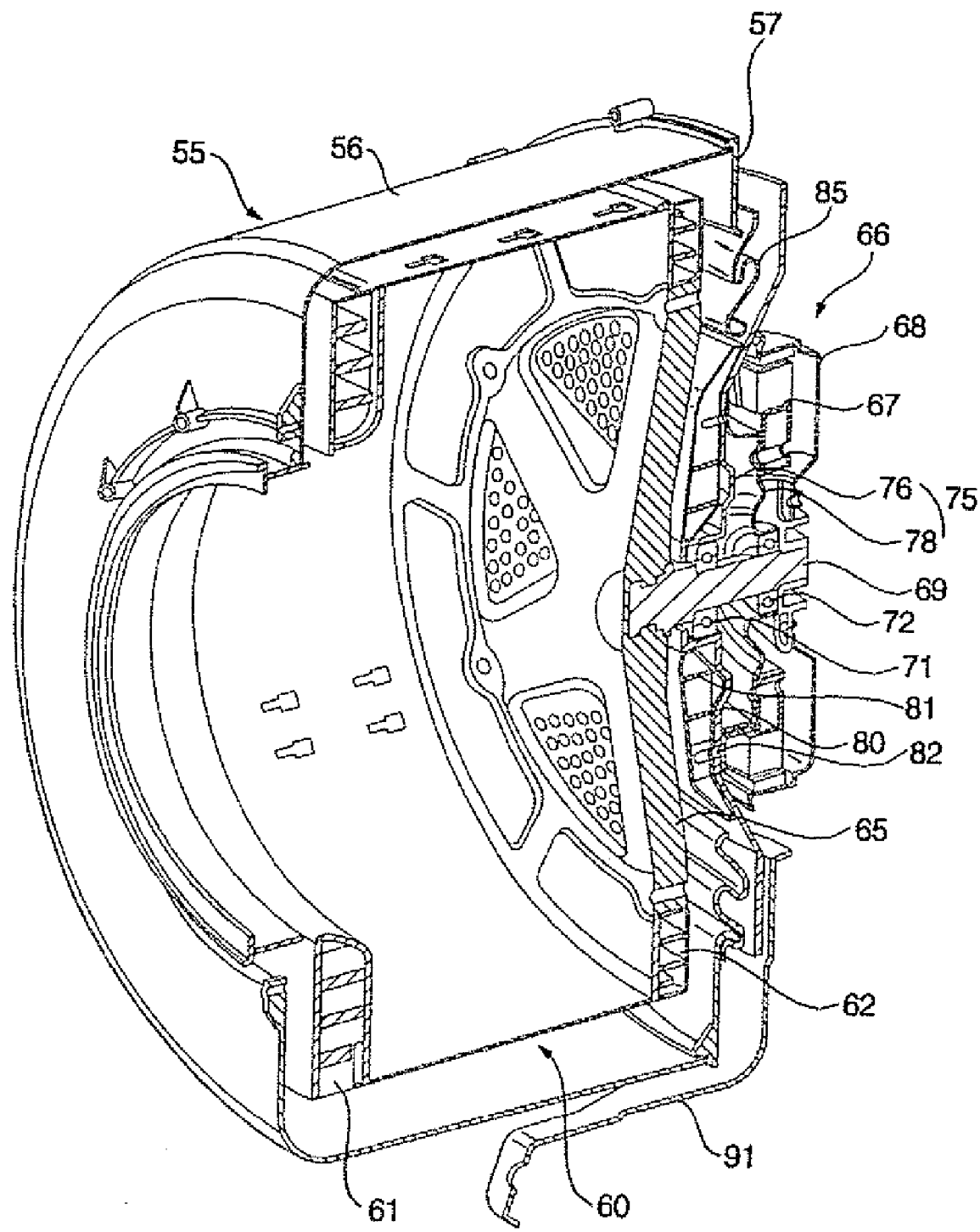
FIG. 4 is a partially sectional perspective view illustrating main parts of the drum type washing machine according to the preferred embodiment of the present invention.
Figure 5:
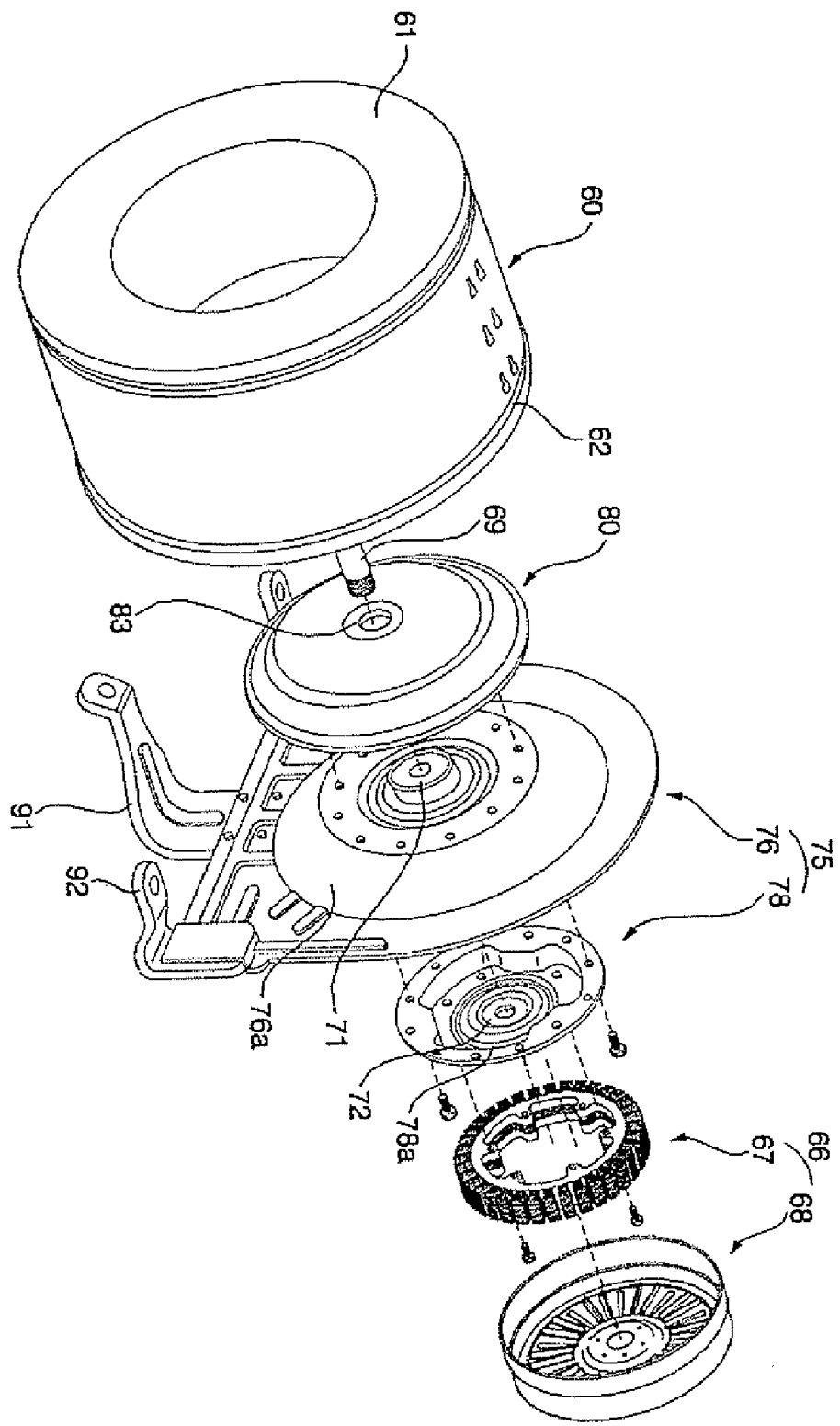
FIG. 5 is a perspective view illustrating main parts of the drum type washing machine according to the preferred embodiment of the present invention.
Figure 6:
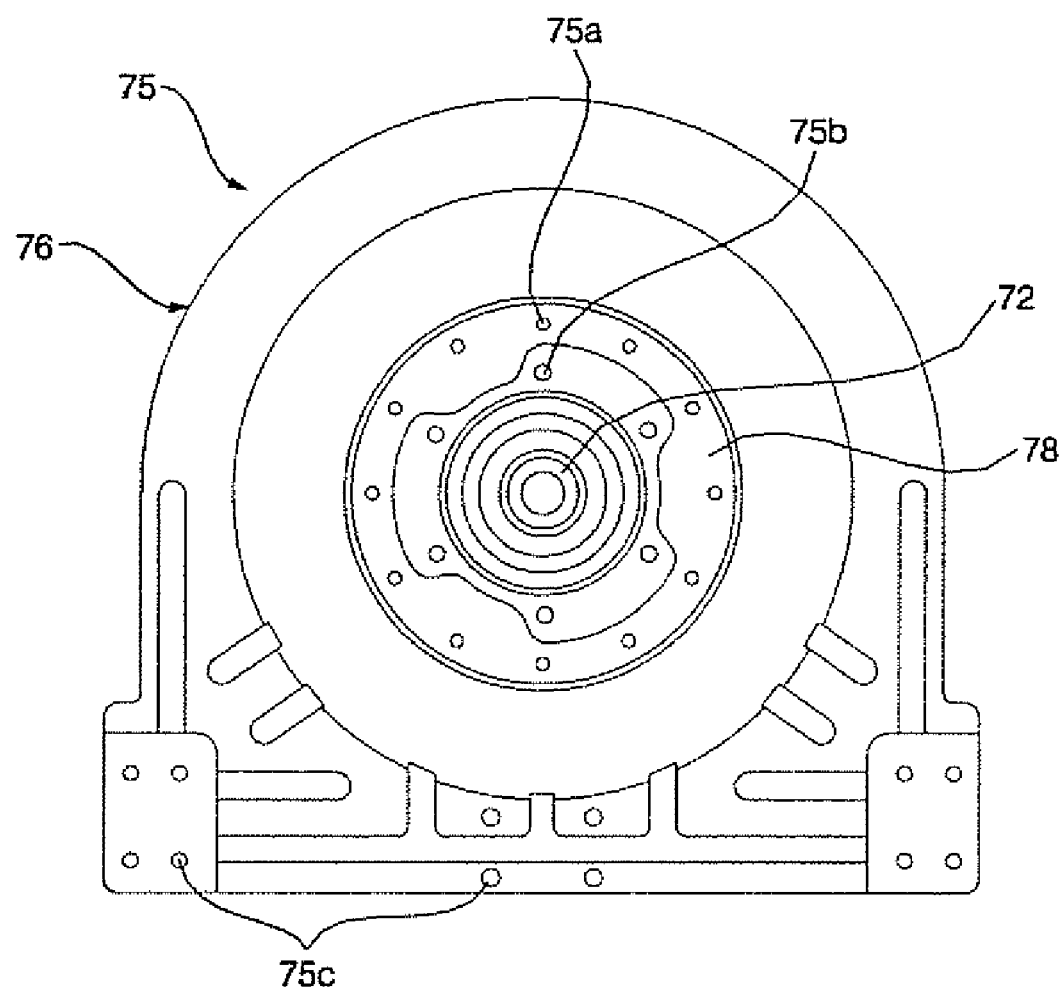
FIG. 6 is a rear side view of a bearing housing installed in the drum type washing machine according to the preferred embodiment of the present invention.

FIGS. 3 to 6 are views illustrating the drum type washing machine according to the preferred embodiment of the present invention; FIG. 3 is a sectional elevation view illustrating an inner structure of the drum type washing machine according to the preferred embodiment of the present invention, FIG. 4 is a partially sectional perspective view illustrating main parts of the drum type washing machine according to the preferred embodiment of the present invention, FIG. 5 is a perspective view illustrating main parts of the drum type washing machine according to the preferred embodiment of the present invention, and FIG. 6 is a rear side view of a bearing housing.

The drum type washing machine according to the preferred embodiment of the present invention, as shown in FIG. 3, includes a rectangular box-shaped cabinet 50 and a tub 55 directly connected to and installed in the cabinet 50 to accommodate washing water. In other words, although, in the conventional drum type washing machine, a tub is connected to a cabinet by a spring and a damper, but in the drum type washing machine according to the preferred embodiment of the present invention, the tub 55 is directly fixed to the cabinet 50 by bolts and nuts 55a without need for a damper.

As such, a drum 60, in which the tub 55 is directly installed and the laundry is washed, and vibration elements, such as a motor 66 for rotating the drum 60, are supported in the cabinet 50 by a suspension 90, such that vibration generated when the drum 60 is rotated can be reduced.

Especially, the drum 60 is connected to the motor 66 by a rotation shaft 69 and is rotated by the motor 66. Between the drum 60 and the motor 66, a bearing housing 75 including bearings 71 and 72 for supporting the rotation shaft 69, is installed. The suspension 90 is connected to the bearing housing 75 such that the vibration elements, such as the drum 60, the motor 66, and the like, are supported in the cabinet 50 by the bearing housing 75.

In front of the bearing housing 75, a bracket 80 is provided to form the rear side of the tub 55, and a gasket 85 installed between the bracket 80 and the rear portion of the tub 55 is installed to prevent vibration from being transmitted from the vibration elements to the tub 55 and to prevent water accommodated in the tub 55 from leaking.

Main parts of the drum type washing machine according to the preferred embodiment of the present invention, structured as described above, will be described as follows.

Preferably, the cabinet 50 takes the shape of a rectangular container like that of the conventional drum type washing machine, and has a door 52 installed at the front side thereof to open and close the tub 55.

The tub 55 includes a tub main body 56 directly fixed to the front side of the cabinet 50, and a ring-shaped tub cover 57, which is installed at the rear side of the tub main body 56 and includes an intermediate part where the bracket 80 and the rear gasket 85 are positioned.

The drum 60 is supported, by connecting the rear part of the drum 60 to the rotation shaft 69, and has a hub 65 to which the rotation shaft 69 is connected. The drum 60 includes a plurality of lifts 63 installed at the inner side thereof to raise and release the laundry in the drum 60. The drum 60 further includes balancers 61 and 62 installed at the front and rear sides of the drum 60 to balance the drum 60 during the rotation of the drum 60.

The motor 66 is an abduction motor and is mounted at the rear side of the bearing housing 75 such that a stator 67 is coupled with the bearing housing 75 by bolts and a rotor 68 is coupled with the rotation shaft 69 by bolts.

Especially, the bearing housing 75, as shown in FIG. 5, includes a main bearing housing 76 in which the bracket 80 is fixed, and a sub-bearing housing 78 smaller than the main bearing housing 76 and coupled with the rear side of the main bearing housing 76 by bolts, in which the motor 66 is fixed.

Here, the main bearing housing 76 has a semi-circular upper side higher than a part through which the rotation shaft 69 penetrates and a rectangular lower side lower than the part through which the rotation shaft 69 penetrates such that damper brackets 91 and 92 of the suspension 90 are connected to the lower side.

The circular sub-bearing housing 78 is similar in size to the stator 67 of the motor 66.

The main bearing housing 76 and the sub-bearing housing 78 are convex in opposite directions to form a predetermined space therebetween. Thus, since the central portions of the bearing housings 76 and 78, through which the rotation shaft 69 penetrates, are spaced apart from each other, the two bearings 71 and 72, which are tightly fitted against the central portions of the bearing housings 76 and 78, are fixed at a predetermined distance. Moreover, the bracket 80 and the stator 67 of the motor 66 closely contact and are fixed to the convex portions 76a and 78a of the bearing housings 76 and 78 by bolts, respectively.

The bearing housing 75 is preferably manufactured by drawing the convex portions 76a and 78a using a steel plate press Next, the bracket 80 is made of non-oxidizable synthetic resin and prevents water from entering the bearing housing 75 through the front side of the bearing housing 75 The bracket 80 includes a water seal 83, installed at the intermediate portion thereof and serving as a seal member, for preventing washing water from leaking between the bracket 80 and the rotation shaft 69.

The bracket 80 includes a plurality of radial shaped or lattice-shaped ribs 81 to reinforce the bracket 80 and bolt holes 82 to couple the bracket 80 to the bearing housing 75 using bolts.

In FIG. 6, reference numeral 75a is assigned to bolt holes, communicated from the bolt hole of the main bearing housing 76 and the sub-bearing housing 78 to bolt holes 82 of the bracket 80, through which bolts are fastened, and reference numeral 75b is assigned to bolt holes to couple the stator 67 using bolts, and reference numeral 75c is assigned to couple damper brackets 91 and 92 using bolts.

Meanwhile, in the suspension 90, dampers 93 and 95 are installed between the damper brackets 91 and 92 connected to the main bearing housing 76 and a base of the cabinet 50, in which a main damper 93, positioned between the damper bracket 91 and the damper 95 as seen in FIG. 3, between the damper brackets 91 and 92 and the base of the cabinet 50, is installed at an angle, and sub-dampers 95, positioned at both sides of the main damper 93, are vertically installed to absorb vibration generated by the vibration elements.

Operation of the drum type washing machine having the structure as described above according to the preferred embodiment of the present invention will be described as follows.

According to the drum type washing machine in accordance with the preferred embodiment of the present invention, since the tub 55 is directly installed to the cabinet 50, the size of the tub 55 can be increased when the cabinet 50 has the same volume as that of the cabinet in the conventional drum type washing machine. Thus, since the drum 60 installed in the tub 55 can also be relatively increased in size, the washing capacity of the drum type washing machine according to the preferred embodiment of the present invention can be increased without increase of the size of the cabinet 50.

The assembly of the drum type washing machine according to the preferred embodiment of the present invention will be described with respect to the bearing housing 75 as follows. First, the main bearing housing and the sub-bearing housing 78, in which the bearings 71 and 72 are respectively installed, contact each other and are assembled by bolts.

The bracket 80, in which the water seal 83 is installed, is coupled with the front side of the assembly of the main bearing housing 76 by bolts, and the stator 67 of the motor 66 is coupled with the rear side of the sub-bearing housing 78 by bolts.

As such, after assembling the bracket 80, the bearing housing 75, and the stator 67, the rotation shaft 69 connected to the hub 62 of the drum 60 penetrates the water seal 83 of the bracket 80, the bearings 71 and 72 of the bearing housing 75, and the stator 67, and then the rotor 68 is coupled with an end of the penetrating rotation shaft 69.

Meanwhile, after the suspension 90 is connected to the bearing housing 75, the drum 60 is inserted into the rear side of the tub 55 directly fixed to the cabinet 50 and the suspension 90 is fixed to the base of the cabinet 50, so that the bracket 80, the bearing housing 75, and the motor 66, which are coupled with the drum 60, are installed in the cabinet 50.

Subsequently, the tub 55 and the bracket 80 are connected to each other via the gasket 85 so that assembly of the main parts of the drum type washing machine according to the preferred embodiment of the present invention is completed.

In the assembly of the drum type washing machine according to the preferred embodiment of the present invention as described above, since the bearing housing 75 is not installed to the tub by insert-molding, but can be separated from the tub, the bearing housing 75 can be installed in a drum type washing machine having a difference volume.

Moreover, since the bracket 80 is made of synthetic resin including plastic and is installed to the front side of the metal bearing housing 75 such that the bracket 80 and the gasket 85 form the rear side of the tub 55, the bearing housing 75 is not easily eroded due to water even after extended use. Since the water seal 83 is installed at the intermediate portion of the bracket 80, water is prevented from leaking so that the bearings 71 and 72 and the bearing housing 75 are prevented from being damaged.

As described above, according to the drum type washing machine of the present invention, since the tub is directly installed to the cabinet and the vibration elements, such as the drum, the motor, and the like, are supported on the cabinet by the suspension, volumes of the tub and the drum can be easily increased and the tub and the drum having the increased volumes can be installed in the cabinet without increasing the volume of the cabinet.

Moreover, in the drum type washing machine according to the present invention, since the bearing housing is separated from the tub instead of being fixed to the tub by the insert molding, when one of the tub and the bearing housing malfunctions, only the malfunctioning component must be replaced. According to the present invention, when either the tub or the bearing housing of a drum type washing machine malfunctions, the malfunctioning component may be replaced using a drum or bearing housing designed for a drum type machine of a different volume. Thus, the parts are interchangeable among drum type washing machines with different volumes.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The present disclosure relates to subject matter contained in Korean Application No, 10-2004-0056258, filed on Jul. 20, 2004, the contents of which are herein expressly incorporated by reference in its entirety.

What is claimed is:

1. A drum type washing machine comprising:
   a cabinet;
   a tub installed in the cabinet, at least one side of the tub being fixed directly to the cabinet;
   a drum that is rotatably disposed within the tub;
   a motor that rotates the drum;
   a bearing housing that is provided with bearings for supporting a rotation shaft that is connected between the drum and the motor; and
   a plurality of suspensions connected to a bottom surface of the cabinet and the bearing housing,
   wherein at least one of the suspensions is positioned to be inclined and the other suspension or suspensions are positioned to be substantially vertical.

2. The drum type washing machine as set forth in claim 1, wherein the plurality of suspensions comprises a main damper that is positioned at the center thereof and a sub damper that is positioned at a side of the main damper.

3. The drum type washing machine as set forth in claim 2, wherein the main damper is connected to a damper bracket that is connected to the center of a lower part of the bearing housing.

4. The drum type washing machine as set forth in claim 3, wherein the bearing housing is provided with a fastening hole in which a damper bracket is assembled at the center of the lower part thereof.

5. The drum type washing machine as set forth in claim 2, wherein the sub damper is positioned at each side of the main damper.

6. The drum type washing machine as set forth in claim 2, wherein the sub damper is connected to a damper bracket that is connected to the left side or the right side of a lower part of the bearing housing.

7. The drum type washing machine as set forth in claim 6, wherein the bearing housing is provided with a fastening hole in which a damper bracket is assembled at the left side or the right side of the lower part thereof.

8. The drum type washing machine as set forth in claim 2, wherein the main damper is positioned to be inclined and the sub damper is positioned to be vertical.

9. The drum type washing machine as set forth in claim 1, further comprising a bracket that is installed in the bearing housing; and
   a gasket that is provided between the bracket and the tub.

10. The drum type washing machine as set forth in claim 1, wherein the bearing housing comprises a main bearing housing that has bearings for supporting the rotation shaft and to which the plurality of suspensions is connected, and a sub-bearing housing that has bearings for supporting the rotation shaft and to which a stator of the motor is fixed.

11. The drum type washing machine as set forth in claim 1, wherein each of the plurality of suspensions comprises damper brackets in which an upper part thereof is coupled to the bearing housing and a lower part thereof is bent, and dampers that are connected to the lower part of the damper brackets and the bottom surface of the cabinet, respectively.

12. A drum type washing machine comprising:
   a cabinet;
   a tub installed in the cabinet, at least one side of the tub being fixed directly to the cabinet;
   a drum that is rotatably disposed within the tub;
   a motor that rotates the drum;
   a bearing housing that is provided with bearings for supporting a rotation shaft that is connected between the drum and the motor; and
   a plurality of suspensions connected to a bottom surface of the cabinet and each of a left side, a right side, and a center of the bearing housing.

13. The drum type washing machine as set forth in claim 12, wherein the plurality of suspensions comprises a main damper that is positioned at the center thereof and a sub damper that is positioned at each side of the main damper.

14. The drum type washing machine as set forth in claim 13, wherein the main damper is connected to a damper bracket that is connected to the center of the lower part of the bearing housing.

15. The drum type washing machine as set forth in claim 13, wherein the sub damper is connected to a damper bracket that is connected to the left side or the right side of the lower part of the bearing housing.

16. The drum type washing machine as set forth in claim 13, wherein the plurality of suspensions comprises damper brackets in which an upper part thereof is coupled to the bearing housing and a lower part thereof is bent, and dampers that are connected to the lower part of the damper brackets and the bottom surface of the cabinet, respectively.

17. The drum type washing machine as set forth in claim 12, further comprising a bracket that is installed in the bearing housing; and
   a gasket that is provided between the bracket and the tub.

18. The drum type washing machine as set forth in claim 12 wherein the bearing housing comprises a main bearing housing that has bearings for supporting the rotation shaft and to which the plurality of suspensions is connected, and a sub-bearing housing that has bearings for supporting the rotation shaft and to which a stator of the motor is fixed.

19. A drum type washing machine comprising:
   a cabinet;
   a tub installed in the cabinet, at least one side of the tub being fixed directly to the cabinet;
   a drum that is rotatably disposed within the tub;
   a motor that rotates the drum;
   a bearing housing that is provided with bearings for supporting a rotation shaft that is connected between the drum and the motor;
   a bracket that is installed in the bearing housing;
   a gasket that is provided between the bracket and the tub; and a plurality of suspensions that is connected between the cabinet and a lower part of the bearing housing.

20. The drum type washing machine as set forth in claim 19, wherein the bearing housing comprises a main bearing housing that has bearings for supporting the rotation shaft and to which the plurality of suspensions is connected, and a sub-bearing housing that has bearings for supporting the rotation shaft and to which a stator of the motor is fixed.

21. The drum type washing machine as set forth in claim 19, wherein the plurality of suspensions comprises damper brackets in which an upper part thereof is coupled to the bearing housing and a lower part thereof is bent, and dampers that are connected to the lower part of the damper brackets and the bottom surface of the cabinet, respectively.

* * * * *